US007991949B2

(12) United States Patent
Gabryjelski et al.

(10) Patent No.: US 7,991,949 B2
(45) Date of Patent: Aug. 2, 2011

(54) EMBEDDED VIRTUAL MEDIA

(75) Inventors: Henry Paul Gabryjelski, Seattle, WA (US); David Burg, Bellevue, WA (US); Ravinder Singh Thind, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 12/028,834

(22) Filed: Feb. 11, 2008

(65) Prior Publication Data

US 2009/0100221 A1 Apr. 16, 2009

Related U.S. Application Data

(60) Provisional application No. 60/979,419, filed on Oct. 12, 2007.

(51) Int. Cl.
*G06F 12/00* (2006.01)
(52) U.S. Cl. .......... 711/112; 711/4; 711/111; 711/170; 369/47.1; 369/47.12; 369/47.13
(58) Field of Classification Search ...... 711/4, 111–112, 711/170–172, 202; 369/47.1, 47.12, 47.13, 369/47.22
See application file for complete search history.

(56) References Cited

U.S. PATENT DOCUMENTS

| | | | |
|---|---|---|---|
| 5,386,402 A | 1/1995 | Iwata | |
| 6,377,500 B1 | 4/2002 | Fujimoto et al. | |
| 6,427,186 B1 | 7/2002 | Lin et al. | |
| 6,467,014 B1 | 10/2002 | Bolt | |
| 7,130,978 B2 | 10/2006 | Kamano et al. | |
| 7,191,344 B2 | 3/2007 | Lin et al. | |
| 7,263,056 B2 | 8/2007 | Allen | |
| 2007/0008852 A1 | 1/2007 | Kobayashi | |
| 2007/0019533 A1* | 1/2007 | Ogawa et al. | 369/275.3 |
| 2007/0058806 A1 | 3/2007 | Ferguson | |
| 2007/0088898 A1 | 4/2007 | Gabryjelski | |

FOREIGN PATENT DOCUMENTS

| | | |
|---|---|---|
| CN | 1901074 A | 1/2007 |
| JP | 09-139053 A | 5/1997 |
| JP | 2002-015430 A | 1/2000 |
| JP | 2001-351335 A | 12/2001 |

OTHER PUBLICATIONS

Sui, et al., "A Critical Analysis and Improvement of AACS Drive-Host Authentication", Cryptology ePrint Archive, 2007, pp. 1-17.
International Search Report and Written Opinion Received for PCT Application No. PCT/US2008/078531, mailed on Mar. 10, 2009, 12 pages.
Thibadeau, et al., "Trusted Computing Group's Proposed Standard for Storage Device Security", Analog Zone, pp. 1-7, retrieved Nov. 19, 2007.
Chinese Patent Application 200880111446.4 (corresponds to present application), Office Action, 8 pages, mailed Mar. 3, 2011 from The State Intellectual Property Office of the People's Republic of China.

* cited by examiner

*Primary Examiner* — Jasmine Song
(74) *Attorney, Agent, or Firm* — Capitol City TechLaw; Richard C. Irving (57) ABSTRACT

A method and an optical storage medium are provided for storing data to and accessing data from an embedded virtual medium within the optical storage medium. Information describing the embedded virtual medium may be stored on to the optical storage medium. Space for an embedded lead-in area of the embedded virtual medium, as well as user data for the embedded virtual medium, may be allocated within a data zone of the optical medium. A spare sector bitmap may be included in a lead-an area of the optical medium indicating spare sectors within the embedded virtual medium as being unavailable. A spare sector bitmap may be included within the embedded virtual medium indicating available spare sectors of the embedded virtual medium. Physical sector/logical block mapping of the optical storage medium may be modified for accessing data stored on the embedded virtual medium.

20 Claims, 7 Drawing Sheets

EMBEDDED VIRTUAL MEDIA

This application claims the benefit of U.S. Provisional Application No. 60/979,419, entitled "Embedded Virtual Media", and filed in the U.S. Patent and Trademark Office on Oct. 12, 2007.

BACKGROUND

An attempt has been made to provide secure storage on a removable medium, such as an optical disk. However, the attempt to provide the secure storage had several limitations, such as, for example: the removable medium was not fully backward compatible with earlier versions of the medium; a firmware implementation was very complex due to, for example, a logical block address (LBA) space with "holes" as well as other issues; edge cases, and a changing maximum number of available tracks or sessions on the medium.

Physical sectors are all sectors on a medium, including those sectors not normally accessible by a user. LBA space includes only those sectors on the medium that the user can read and typically starts at some physical sector number other than zero.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first embodiment consistent with the subject matter of this disclosure, a method and an optical storage medium may be provided. The optical storage medium may have a lead-in area and a lead-out area. One or more embedded virtual media may be created within an optical storage medium. The one or more embedded virtual media may store encrypted or unencrypted user data. Information describing the one or more embedded virtual media may be stored onto the optical storage medium. An embedded lead-in area of an embedded virtual medium may have space allocated for user data within the embedded virtual medium.

In a second embodiment consistent with the subject matter of this disclosure, a method for accessing information from an embedded virtual medium on an optical storage medium may be provided. Information recorded on the optical medium, which describes the embedded virtual medium, may be detected. A physical sector number/logical block address mapping for the optical storage medium may be modified to reflect a physical sector number/logical block address mapping for the embedded virtual medium. A command may be received for switching access from the optical storage medium to the embedded virtual medium.

In a third embodiment consistent with the subject matter of this disclosure, an optical medium is provided. The optical medium may include a data zone for storing user data, an inner zone separating a physical beginning of a written or writable region from a beginning of the data zone, an outer zone separating an end of the data zone from a physical end of the written or writable region, and an embedded virtual medium included within the data zone for storing embedded user data.

In some implementations, the data zone of the optical medium may include a first session including information with respect to a legacy file system, and a second session including the embedded virtual medium and information describing the embedded virtual medium. In other implementations, the optical medium may have two layers. A first layer may include a lead-in area, a first portion of the data zone, and a middle area reserved for layer transitions. A first portion of the embedded virtual medium may be included in the first portion of the data zone. A second layer may include a second middle area reserved for layer transitions, a lead-out area, and a second portion of the data zone. The second portion of the data zone may include a second portion of the embedded virtual medium.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a method and a machine-readable medium that provides a secure removable optical storage medium. An embedded virtual medium may be created within an optical storage medium, such that the optical storage medium may be fully backwards compatible with a legacy optical drive, while making the embedded virtual medium accessible to an optical drive executing with new firmware.

In some embodiments, the embedded virtual medium may include encrypted data. The encrypted data may be decrypted using the new firmware of the optical drive, along with a key provided by a user. In other embodiments, the encrypted data included in the embedded virtual medium may be decrypted by a user's processing device using a user provided key. In yet other embodiments, the encrypted data included in the embedded virtual medium may be decrypted by using a combination of keys, for example, some from the user, some from the optical storage medium, and/or some from an external data source.

Optical Drive

Figure 1:
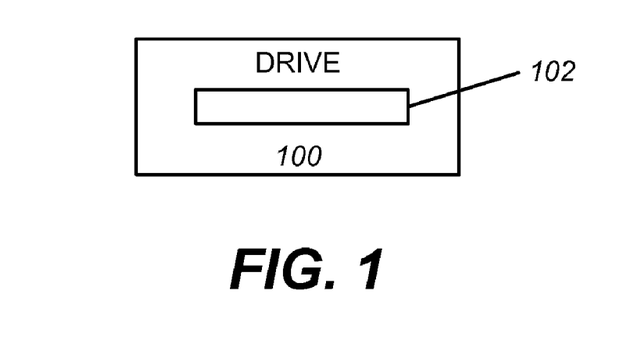
FIG. 1 illustrates an exemplary optical drive consistent with the subject matter of this disclosure.

FIG. 1 illustrates an optical drive 100 consistent with the subject matter of this disclosure. Optical drive 100 may receive an optical medium, such as, for example, a Digital Video Disk (DVD) or other optical medium, via opening 102. Optical drive 100 may be capable of reading from and writing to the optical medium.

Figure 2:
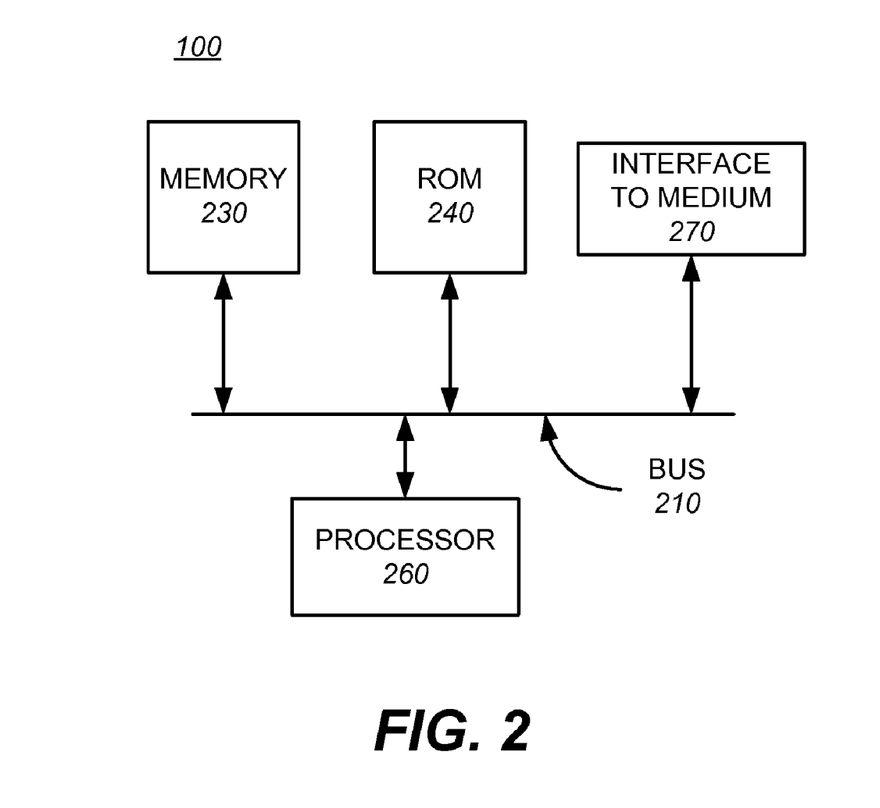
FIG. 2 is a functional block diagram illustrating aspects of the exemplary optical drive of FIG. 1.

FIG. 2 is a functional block diagram illustrating aspects of optical drive 100. Optical drive 100 may include a bus 210, a memory 230, a read only memory (ROM) 240, and a processor 260. Bus 210 may permit communication among components of optical drive 100.

Processor 260 may include at least one conventional processor or microprocessor that interprets and executes instructions. Memory 230 may be a random access memory (RAM) or another type of dynamic storage device that stores information and/or instructions for execution by processor 260. Memory 230 may also store temporary variables or other intermediate information used during execution of instructions by processor 260. ROM 240 may include a conventional ROM device or another type of static storage device that stores static information and instructions for processor 260, such as, for example, firmware.

Optical drive 100 may perform such functions in response to processor 260 executing sequences of instructions contained in a tangible machine-readable medium, such as, for example, memory 230, ROM 240, or other medium. Such instructions may be read into memory 230 from a machine-readable medium or from a separate device via a communication interface (not shown).

Exemplary Optical Medium

Figure 3:
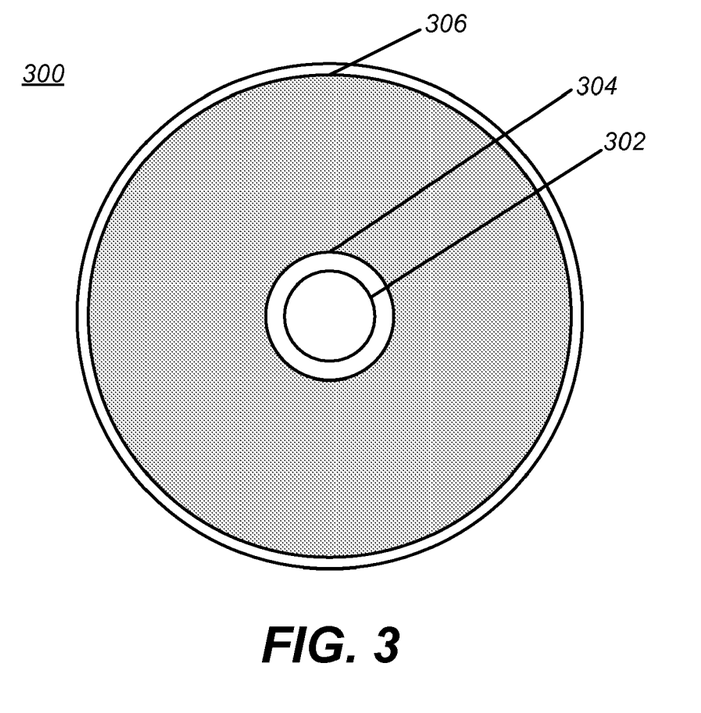
FIG. 3 shows an exemplary optical storage medium consistent with the subject matter of this disclosure.

FIG. 3 illustrates an exemplary optical medium 300 consistent with the subject matter of this disclosure. In one embodiment, optical medium 300 may be a DVD. Optical medium 300 may include a center hole 302. Data may be stored in a layer of optical medium 300 having known reflective properties. Recording of data may be along a spiral which may start at an inner portion 304 of optical medium 300, near center hole 302, and may end at an outer portion 306 of optical medium 300. If a second layer is present, the second layer may include a spiral which may start at the outer portion 306 and may end near center hole 302.

Figure 4:
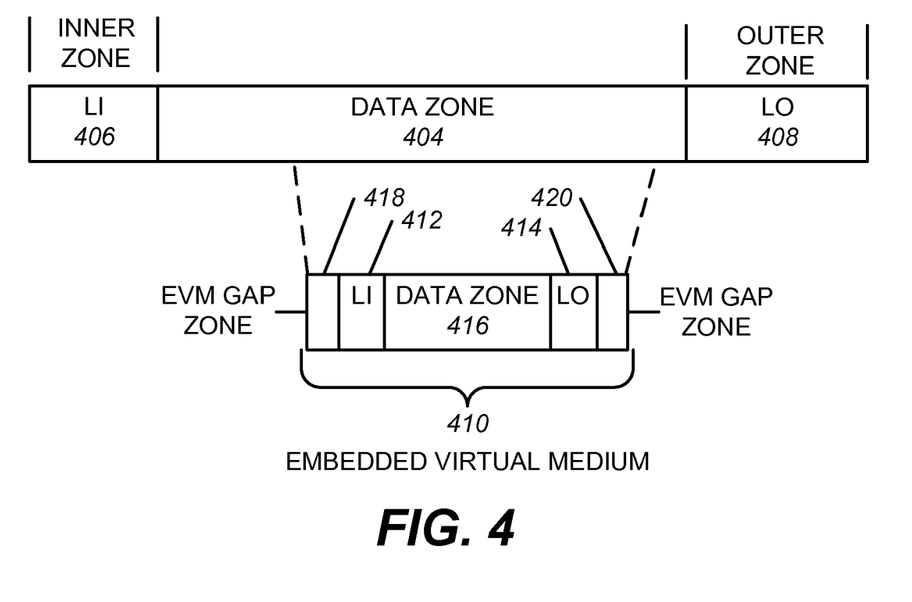
FIGS. 4-8 illustrate various exemplary layouts of optical storage media consistent with the subject matter of this disclosure.

FIG. 4 illustrates an exemplary structure of a single layer optical medium consistent with the subject matter of this disclosure. Examples of optical media having a single layer include, but are not limited to, -ROM, +RW, and -RAM. The optical medium may include an inner zone, a data zone 404, and an outer zone. The inner zone is a region that separates a physical beginning of a written or writable region from a beginning of the data zone. Data zone 404 is a written or writable region reserved for user data. The outer zone is a region that separates an end of data zone 404 from a physical end of the written or writable region.

On the exemplary single layer optical medium, a lead-in (LI) 406 may be a contiguous region of the inner zone adjacent to data zone 404. In some embodiments, lead-in 406 may be the inner zone. LI 406 may include information regarding organization of recorded space of the single layer optical medium.

A lead-out (LO) 408 may be a contiguous region of the outer zone adjacent to data zone 404. In some embodiments, LO 408 may be the outer zone. LO 408 may include information regarding the organization of recorded space of the single layer optical medium.

Data zone 404 may include an embedded virtual medium (EVM) 410. EVM 410 may include a LI 412, a LO 414, a data zone 416, and EVM Gap Zones 418, 420.

LI 412 may include at least a portion of information related to organization of recorded space of EVM 410. For example, LI 412 may include information specific to the virtual media, as well as other information, such as, for example, power calibration information. In some embodiments, LI 412 may not include one or more types of information included in LI 406. For example, power calibration information may be included in LI 406, but not included in LI 412. Other examples may include Buffer Zones (typically all zero data), information with fixed values for a specific physical media type, etc., which may be included in LI 406, but may not be included in LI 412.

LO 414 may include at least a portion of information related to organization of the recorded space of EVM 410. In some embodiments, EVM 410 may not include LO 414.

Data zone 416 may include user data. EVM Gap Zones 418, 420 may be unused areas preceding and following LI 412 and LO 414, respectively. In some embodiments, EVM Gap Zones 418 and/or 420 may not exist.

A logical track may be one or more sectors with a well-defined usage sequence. The logical track may be an integral number of media specific writable units. A session may be a collection of one or more logical tracks having consecutive track numbers. The track or session may provide host applications with a method of adding new data to a partially recorded optical medium by, for example, incrementally appending to existing data.

Figure 5:
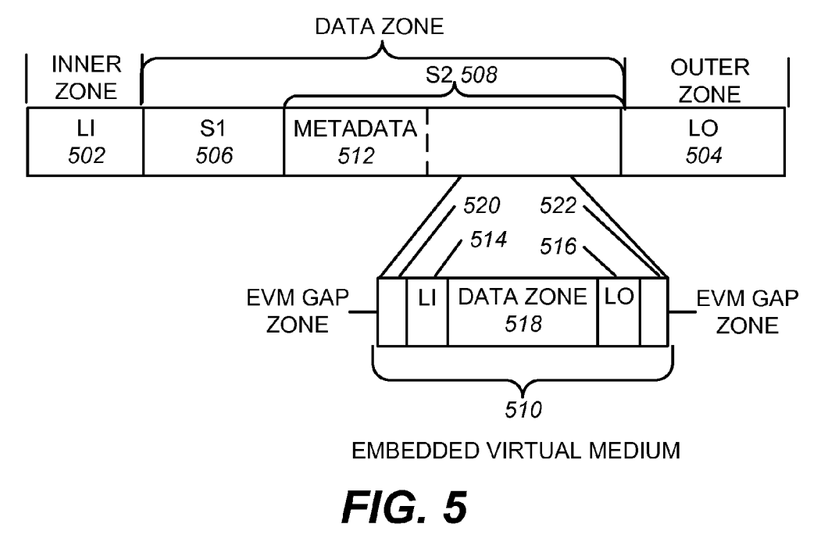

FIG. 5 illustrates an exemplary structure of an optical medium having multiple sessions stored thereon. As illustrated by FIG. 5, the optical medium may include LI 502 and LO 504 in an inner and outer zone, respectively. Lead-in (LI) 502 may be a contiguous region of the inner zone adjacent to a data zone. In some embodiments, lead-in 502 may be the inner zone. LI 502 may include information regarding organization of recorded space of the single layer optical medium. LO 504 may be a contiguous region of the outer zone adjacent to the data zone. In some embodiments, LO 504 may be the outer zone. LO 504 may include information regarding the organization of recorded space of the single layer optical medium.

The data zone may include multiple sessions, such as, for example session 1 506 and session 2 508. Session 1 506 may include information with respect to a legacy file system, such that a non-EVM aware host/computer/CE (Consumer Electronics) or other device may read the file system stored at Session 1 (506). Session 2 508 may include metadata 512 having information describing an EVM 510, and may further include EVM 510. In some embodiments, metadata 512 may be included in a volume descriptor (not shown) in an area outside of EVM 510. In other embodiments, metadata 512 may be included in EVM Gap Zone 520 adjacent to a LI 514 of EVM 510. Metadata 512 may include a physical sector number (PSN) or a logical block address (LBA) of a beginning of EVM 510. Other information may also be included in metadata 512, such as, for example, a name for EVM 510, a unique identifier (UUID) for EVM 510, an ending PSN, as well as other useful information. Metadata 512 may include encrypted data, unencrypted data, software code, security tables, as well as other information.

EVM 510 may include LI 514, a LO 516, a data zone 518, and EVM Gap Zones 520, 522. LI 514 may include at least a portion of information related to organization of recorded space of EVM 510. For example, LI 514 may include information specific to the virtual media, as well as other information, such as, for example, power calibration information. In some embodiments, LI 514 may not include one or more types of information included in LI 502. For example, as similarly mentioned with respect to FIG. 4, power calibration information and/or other data may be included in LI 502, but not included in LI 514. LO 516 may include at least a portion of information related to organization of the recorded space of EVM 510. In some embodiments, EVM 510 may not include LO 516.

Data zone 518 may include user data. EVM Gap Zones 520, 522 may be unused areas preceding and following LI 514 and LO 516, respectively.

Some optical media may enable an optical media drive to manage hardware defects. Examples of such optical media include, but are not limited to, DVD-RAM and rewritable Blu-Ray disc (BD-RE). In optical media capable of enabling an optical media drive to manage hardware defects, areas on the optical media may be set aside as replacements or spare areas to be used when normal areas cannot be written to reliably.

In one implementation, the spare areas may be spread across the optical medium, interleaved at fairly regular intervals, such as, for example, N normal sectors followed by X spare area sectors. An EVM may therefore implicitly include a spare area for sectors included in the EVM when allocating the sectors for the EVM.

Figure 6:
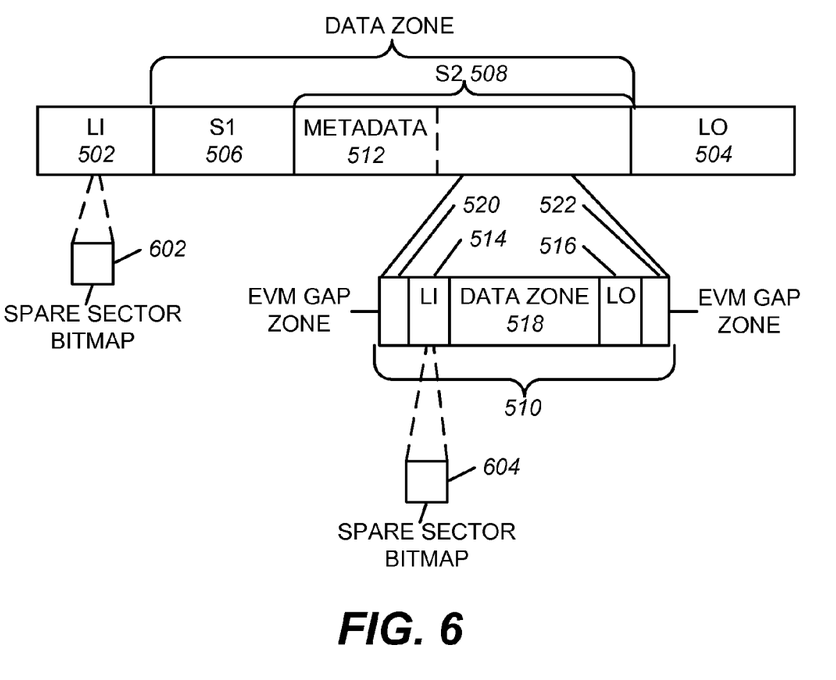

FIG. 6 illustrates the multi-session optical medium of FIG. 5 capable of managing hardware defects. Spare sector bitmap 602 may be included as part of LI 502. Spare sector bitmap 602 may indicate which of spare sectors of the optical medium are in use, bad, available, etc. In one embodiment, spare sector bitmap 602 may indicate that spare sectors included within EVM 510 are bad or damaged in order to prevent a legacy optical drive from using a spare sector within EVM 510.

Spare sector bitmap 604 may be included in LI 514 of EVM 510. Spare sector bitmap 604 may be a bitmap with respect to spare sectors included within EVM 510. As hardware defects are discovered in normal sectors of EVM 510, a spare sector may be selected as a replacement, based on an available spare sector as indicated by spare sector bitmap 604. Optical drive firmware may direct selection of the available spare area sector as the replacement and may direct modification of spare sector bitmap 604 to indicate that the selected spare area sector is in use.

Figure 7:
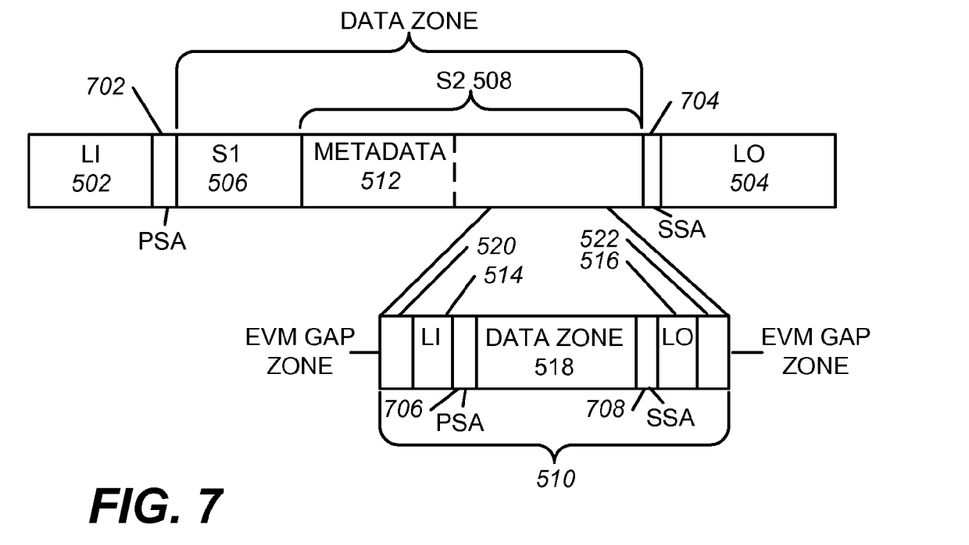

FIG. 7 illustrates the multi-session optical medium of the FIG. 5 with another managed hardware defect implementation. In this implementation, a primary spare area (PSA) 702 and a secondary spare area (SSA) 704 may exist at a beginning and an end, respectively, of the data zone. Each of PSA 702 and SSA 704 may include a respective bitmap regarding the use of spare sectors. The bitmaps of PSA 702 and SSA 704 may indicate that spare sectors included within EVM 510 are bad or damaged in order to prevent a legacy optical drive from using a spare sector within EVM 510. EVM 510 may include PSA 706 and SSA 708, which may include bitmaps with respect to spare sectors included within EVM 510. As hardware defects are discovered in normal sectors of EVM 510, a spare sector may be selected as a replacement, based on an available spare sector as indicated by the bitmap of PSA 706 or SSA 708. Optical drive firmware may direct selection of the available spare area sector as the replacement and modification of the bitmap of PSA 706 or SSA 708 to indicate that the selected spare area sector is in use.

Some optical media are dual-layer media with a first layer recording data in a spiral from an inner portion of the optical media to an outer portion of the optical media and a second layer recording data in a spiral from the outer portion of the optical media to the inner portion of the optical media. A PSN of the first layer may be a bitwise inverse of a PSN of the second layer. Thus, an optical drive may easily seek to a given PSN from either layer, while keeping relative arithmetic between PSN/LBA mappings. However, a small portion of PSNs on the first layer may not have a corresponding PSN on the second layer, as will be explained below.

Figure 8:
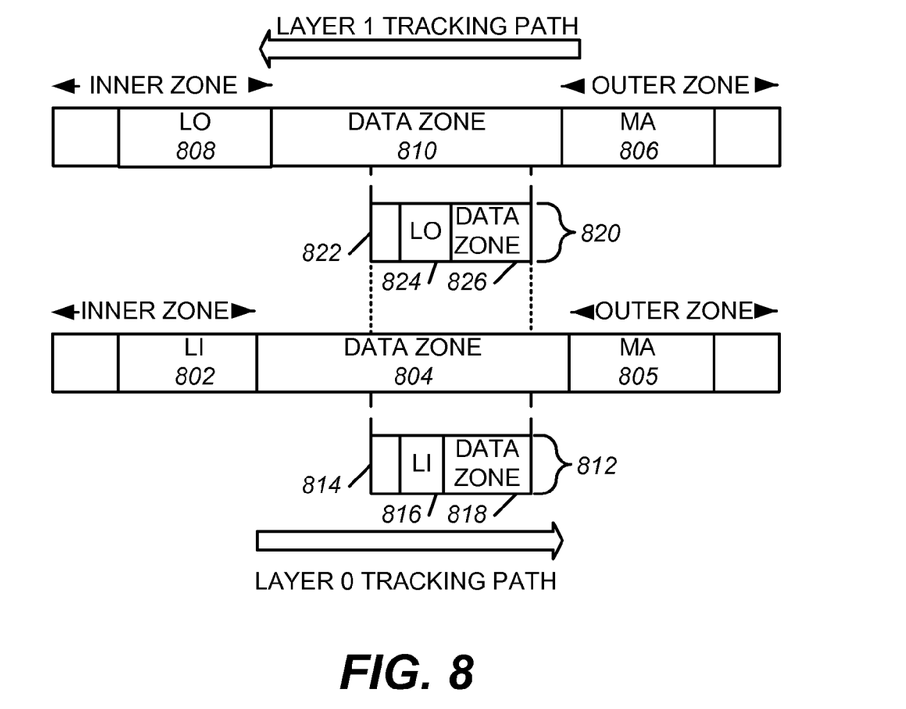

FIG. 8 illustrates an exemplary layout of a dual-layer optical medium consistent with the subject matter of this disclosure. FIG. 8 illustrates a tracking path, or spiral, of layer 0 going from an inner zone to an outer zone of the dual-layer optical disc. LI 802 may be a contiguous region of the inner zone of layer 0 adjacent to a data zone 804 of layer 0. On some dual-layer optical media LI 802 may be the inner zone of layer 0. LI 802 may include information relating to organization of recorded space of the dual-layer optical disc.

The outer zone of layer 0 may include a Middle Area (MA) 805. MA 805 may be a region reserved for layer transitions. Similarly, an outer zone of layer 1 may include a Middle Area (MA) 806, which may be a region reserved for layer transitions.

LO 808 of layer 1 may be a contiguous region of an inner zone of layer 1, adjacent to a data zone 810 of layer 1. LO 808 may include information relating to an organization of recorded space of the dual-layer optical medium.

A tracking path, or spiral, of layer 1 may go from the outer zone of layer 1 to the inner zone of layer 1.

A layer 0 portion of an EVM 812 may be included in data zone 804 and may further include a buffer 814, a LI 816, and a data zone 818. A layer 1 portion of EVM 820 may include a buffer 822, a LO 824, and a data zone 826. Note that buffer 822, LO 824, and data zone 826 may be located on top of buffer 814, LI 816, and data zone 818, respectively.

LO 808 may be slightly larger than LI 802 and MA 805 may be slightly larger than MA 805. Thus, some PSNs of LO 808 and some PSNs of MA 805 may not have corresponding PSNs in layer 0.

Exemplary Processing

Figure 9:
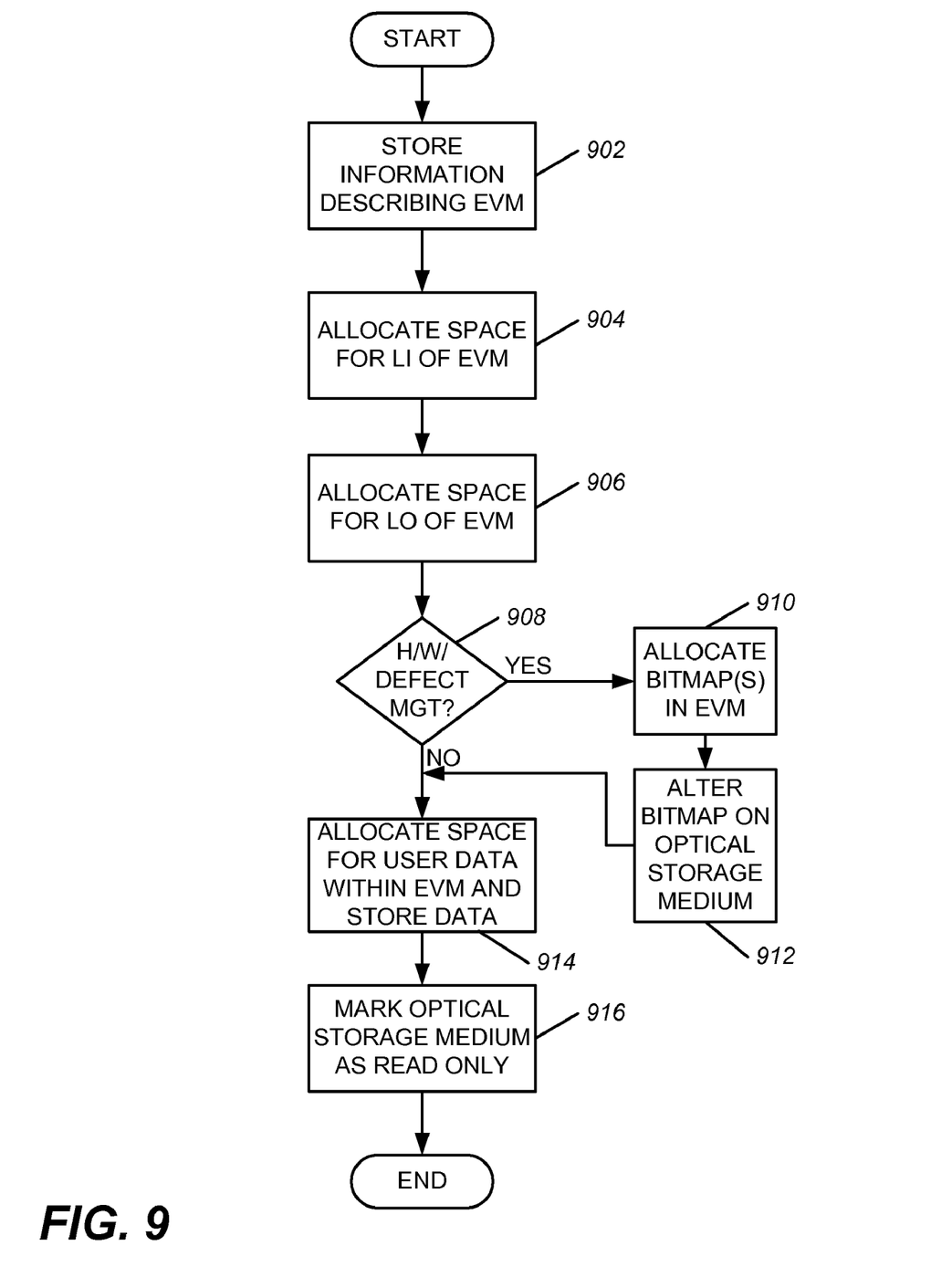
FIG. 9 is a flowchart of an exemplary process, which may be performed on a single session optical storage medium consistent with the subject matter of this disclosure.

FIG. 9 is a flowchart illustrating an exemplary process for creating an EVM within an optical storage medium having a single session. The process may begin with information describing the EVM being stored on the optical storage medium (act 902). The information may include metadata indicating a PSN of a start of the EVM and a size of the EVM. In other embodiments, the information may include other data descriptive of the EVM. In some embodiments, the information may be included in a volume descriptor included on the optical storage medium outside of the EVM.

Next, space may be allocated for a LI of the EVM (act 904) and a LO of the EVM (act 906). The LI and the LO may include information regarding organization of recorded space of the optical storage medium.

A check may be made to determine whether the optical storage medium is of a type capable of hardware defect management (act 908). If the optical storage medium is of a type capable of hardware defect management, then one or more bitmaps regarding spare sectors of the EVM may be allocated, as discussed with respect to FIGS. 6 and 7 (act 910). One or more bitmaps of the optical storage medium, outside of the EVM, may be altered such that the one or more bitmaps indicate that spare sectors included within the EVM are in use or bad (act 912) to prevent a legacy optical drive from using any spare sector areas within the EVM.

Space may then be allocated for a user data area within a data zone of the EVM and data may be stored within the user data area (act 914). The optical storage medium may then be marked as a read only medium (act 916) in order to make it difficult to inadvertently write to the EVM on a legacy optical drive. In some embodiments, the marking of the media as read-only may be done using a password, shared secret, or other authentication/authorization method. Alternatively, the optical storage medium may not be marked as a read only medium.

Figure 10:
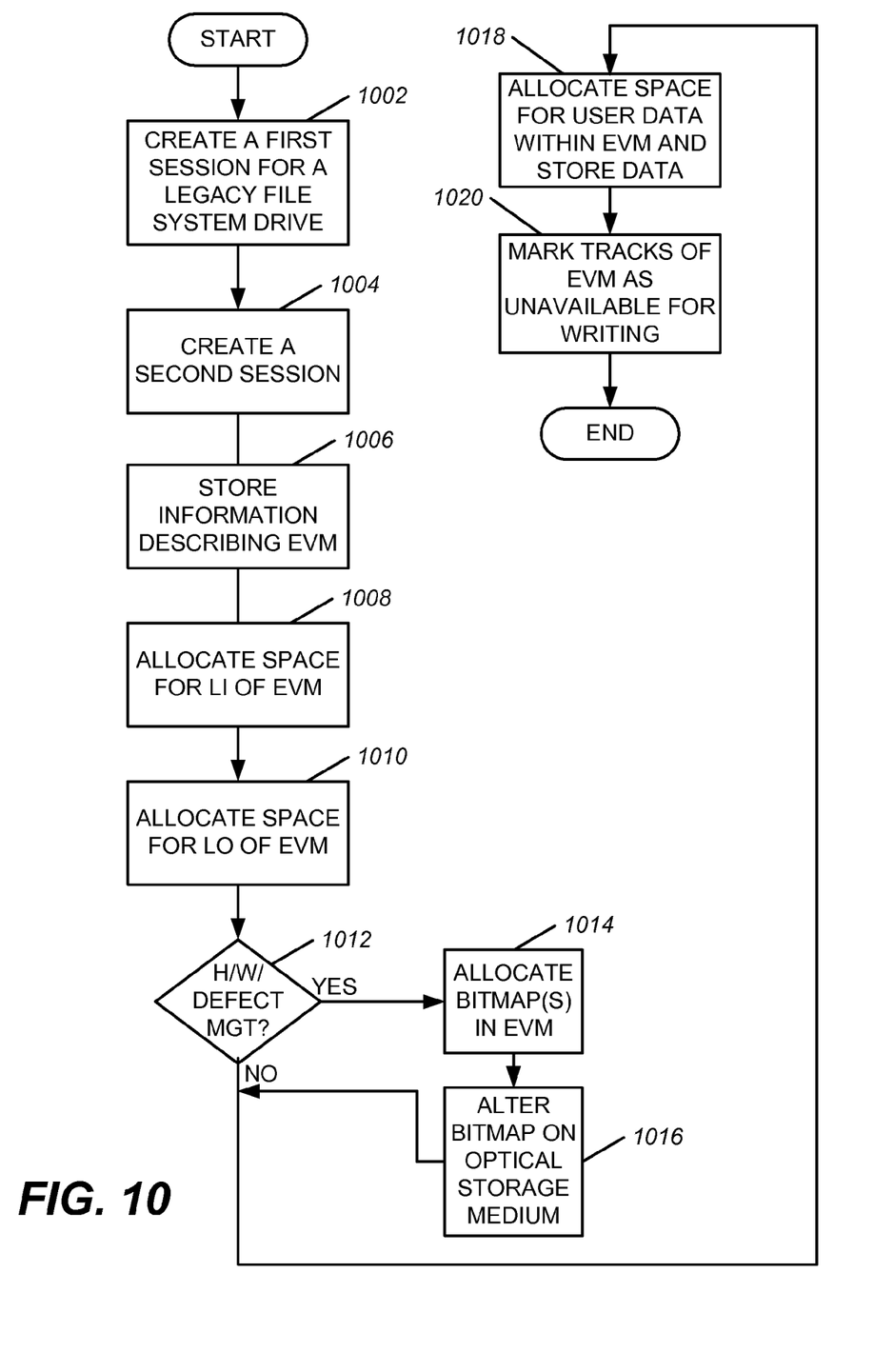
FIG. 10 is a flowchart of an exemplary process, which may be performed on a multiple session optical storage medium consistent with the subject matter of this disclosure.

FIG. 10 is a flowchart illustrating an exemplary process for creating an EVM within an optical storage medium having multiple sessions, such as, for example two sessions. The process may begin with creating a first session within a data zone by allocating at least one logical track within the first session (act 1002). The first session may be a closed session. A second session may then be created by allocating at least one other logical track within the second session (act 1004). The second session may be an open session and may include an EVM.

A legacy optical drive may be capable of reading only from closed sessions. Thus, the legacy optical drive may read data from the first session, but may not be able to read data from the second session. A legacy file system may be added to the first session to enable a legacy optical drive to detect that the optical medium has an EVM, to provide the user with functionality to enable the use of the EVM, and/or to point to a location with additional information about the EVM (i.e. a URL).

Next, the information describing the EVM may be stored on the optical storage medium in the second session (act 1006). The information may include metadata indicating a PSN of a start of the EVM and a size of the EVM. In other embodiments, the information may include other data descriptive of the EVM. The information may be included in a volume descriptor included on the optical storage medium outside of the EVM.

Space may be allocated for a LI of the EVM in the second session (act 1008). The LI may include information regarding organization of recorded space of the EVM. Next, space may be allocated for a LO of the EVM in the second session (act 1010). In some embodiments, a LO may not be allocated for the EVM.

A check may be made to determine whether the optical storage medium is a type capable of hardware defect management (act 1012). If the optical storage medium is of a type capable of hardware defect management, then one or more bitmaps regarding spare sector areas of the EVM may be allocated, as discussed with respect to FIGS. 6 and 7 (act 1014). One or more bitmaps of the optical storage medium, outside of the EVM, may be altered such that the one or more bitmaps indicate that spare sector areas included within the EVM are in use or bad (act 1016) to prevent a legacy optical drive from using any spare sector areas within the EVM.

Space may then be allocated for any user data area within a data zone of the EVM and data may be stored within the user data area (act 1018). Areas of the EVM, such as, for example, tracks of the EVM may be marked as unavailable for writing (act 1020) in order to make it difficult to inadvertently write to the EVM on a legacy optical drive.

Figure 11:
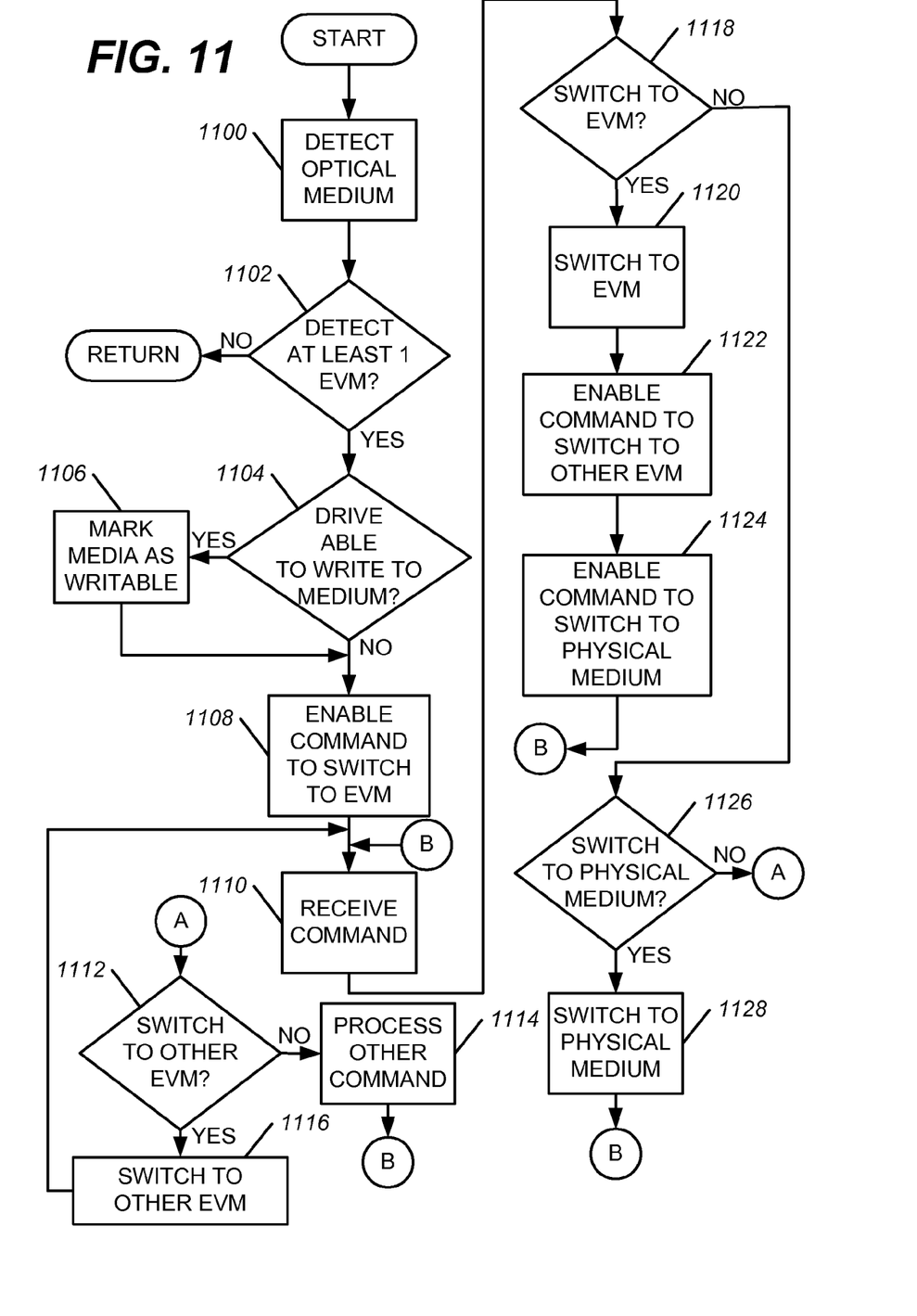
FIG. 11 is a flowchart of an exemplary process for accessing an embedded virtual medium consistent with the subject matter of this disclosure.

FIG. 11 is a flowchart illustrating an exemplary process for reading an optical medium, which may include one or more EVMs. The process may begin with an optical drive detecting a presence of an optical medium (act 1100). The optical medium may have a structure as described in any of FIGS. 4-8. A check may be made to detect a presence of one or more EVMs on the optical medium (act 1102). In some embodiments, the presence of one or more EVMs may be detected by existence of metadata recorded on the optical medium. The metadata may be recorded in a volume descriptor on the optical medium and may include information describing the one or more EVMs. If the presence of one or more EVMs on the optical medium is not detected, then the process may end and the optical medium may be read in a conventional manner.

If the presence of one or more EVMs is detected, then a determination may be made as to whether the optical drive is capable of writing to the optical medium (at 1104). If the optical drive is capable of writing to the optical medium, then the optical medium may be marked as writable (act 1106). In some embodiments, the marking of the media as writable may be done using a password, shared secret, or other authentication/authorization method.

Next, a command to switch from the physical optical medium to the EVM may be enabled (act 1108), such that once the command to switch to the EVM is performed, the EVM may be accessed as if the EVM is the physical optical medium.

The optical drive may then receive a command (act 1110). A check may be made to determine if the command is a "switch to EVM" command (act 1118). If the received command is a "switch to EVM" command, then the optical drive will prepare to access the EVM as described by the metadata, including information with respect to the EVM (act 1120). In some embodiments, the command "switch to EVM" may include portions of the metadata; encryption and/or decryption keys or derivatives; or combinations thereof. When switching to the EVM, modification of a PSN/LBA mapping, or translation, with respect to the EVM, may be performed. In some embodiments, the modification of the PSN/LBA mapping, or translation, may be delayed until the optical drive prepares to access the EVM, in response to receiving a request to access the EVM from a processing device, such as, for example a host computer, or other processing device.

Next, a command to switch to another EVM may be enabled, such that the command to switch to another EVM may be performed if requested (act 1122). A command to switch to the physical medium may be enabled, such that the command to switch to the physical medium may be performed if requested (act 1124). At this point, the EVM may be accessed, and acts 1110-1124 may be repeated upon receiving another command.

If, during act 1118, the received command is determined not to be a "switch to the EVM" command, then a determination may be made to determine whether the received command is a "switch to physical medium" command (act 1126). If the received command is determined to be a "switch to physical medium" command, then the optical drive may perform the "switch to physical medium" command to prepare to access the physical medium, rather than an EVM. After switching to the physical medium, the optical drive may access the physical medium. Act 1110 may then be repeated to receive a next command.

If, during act 1126, the received command is determined not to be a "switch to physical medium" command, then a check may be made to determine whether the received command is a "switch to other EVM" command (act 1112). If the received command is determined to be a "switch to other EVM" command, then the optical drive may switch to the other EVM, as described by metadata recorded on the optical medium (act 1116). The other EVM may then be accessed by the optical drive and act 1110 may be repeated to receive a next command.

If, during act 1112, the received command is determined not to be a "switch to other EVM" command, then the optical drive may process another command, as received (act 1114). Act 1110 may then be repeated to receive a next command.

As previously mentioned, information included within the EVM may be encrypted. In some embodiments, a decryption key from a user, or a combination of decryption keys from multiple sources, such as, for example, the user, the optical medium, an external data source, or other sources may be determined and used for decrypting at least a portion of the EVM.

Miscellaneous

Although not specifically stated above, similar techniques may be applied to other optical media, such as, for example, compact disc (CD), high definition (HD)-DVD, Blu-Ray (BD), or other optical media. Therefore, embodiments are not limited only to DVDs. Further, optical storage media may include one EVM or multiple EVMs.

Although FIGS. 6 and 7 illustrate one or more spare sector bitmaps being included within an EVM, in some embodiments, the EVM may have no spare sector bitmaps or the EVM may have one or more spare sector bitmaps with a size of zero. In other words, defect management of the EVM may be inherited from a physical medium without repeating the one or more spare sector bitmaps within the EVM.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents define the invention, rather than any specific examples given.

We claim as our invention:

1. A method for creating an embedded virtual medium within an optical storage medium having a lead-in area and a lead-out area for the optical storage medium, the method comprising:
   storing information describing the embedded virtual medium onto the optical storage medium;
   allocating space for at least a portion of data for an embedded lead-in area of the embedded virtual medium, the embedded lead-in area being included within the embedded virtual medium;
   allocating space for user data within the embedded virtual medium; and
   marking an optical storage medium bitmap of spare sectors, including spare sectors within the embedded virtual medium, as one of in use or bad with respect to the spare sectors included in the embedded virtual medium, to avoid use as a replacement for a sector of a non-embedded virtual medium area of the optical storage medium.

2. The method of claim 1, further comprising:
   allocating at least one logical track of the optical storage medium to a first session, the at least one logical track of the first session being readable by a legacy drive; and
   allocating at least one other logical track of the optical storage medium to a second session, the embedded virtual medium being included within the second session.

3. The method of claim 2, further comprising:
   adding a legacy file system to the first session to enable the legacy drive to detect that the optical storage medium includes the embedded virtual medium;
   including, in the second session, metadata having information describing the embedded virtual medium.

4. The method of claim 1, further comprising:
   marking the optical storage medium as a read only medium regardless of a type of the optical storage medium.

5. The method of claim 1, further comprising:
   marking areas of the embedded virtual medium as unavailable for writing to prevent a legacy drive from writing to areas of the embedded virtual medium.

6. The method of claim 1, further comprising:
   including encrypted data within the embedded virtual medium.

7. The method of claim 1, further comprising:
   including, within the embedded virtual medium, a second bitmap of spare sectors for the spare sectors included within the embedded virtual medium.

8. The method of claim 1, further comprising:
   creating a plurality of embedded virtual media within the optical storage medium.

9. The method of claim 1, wherein the storing of information describing the embedded virtual medium onto the optical storage medium further comprises:
   recording the information describing the embedded virtual medium in a volume descriptor on the optical storage medium.

10. A memory having instructions recorded thereon for at least one processor, such that when the at least one processor executes the instructions a method is performed for creating an embedded virtual medium within an optical storage medium having a lead-in area and a lead-out area for the optical storage medium, the method comprising:
    storing information describing the embedded virtual medium onto the optical storage medium;
    allocating space for at least a portion of data for an embedded lead-in area of the embedded virtual medium, the embedded lead-in area being included within the embedded virtual medium;
    allocating space for user data within the embedded virtual medium; and
    marking an optical storage medium bitmap of spare sectors, including spare sectors within the embedded virtual medium, as one of in use or bad with respect to the spare sectors included in the embedded virtual medium, to avoid use as a replacement for a sector of a non-embedded virtual medium area of the optical storage medium.

11. The memory of claim 10, wherein the method further comprises:
    allocating at least one logical track of the optical storage medium to a first session, the at least one logical track of the first session being readable by a legacy drive; and allocating at least one other logical track of the optical storage medium to a second session, the embedded virtual medium being included within the second session.

12. The memory of claim 11, wherein the method further comprises:
adding a legacy file system to the first session to enable the legacy drive to detect that the optical storage medium includes the embedded virtual medium;
including, in the second session, metadata having information describing the embedded virtual medium.

13. The memory of claim 10, wherein the method further comprises:
marking areas of the embedded virtual medium as unavailable for writing to prevent a legacy drive from writing to areas of the embedded virtual medium.

14. The memory of claim 10, wherein the method further comprises:
including, within the embedded virtual medium, a second bitmap of spare sectors for the spare sectors included within the embedded virtual medium.

15. An optical drive comprising:
at least one processor; and
a memory operatively connected to the at least one processor and having instructions recorded thereon for the at least one processor to perform a method, the method comprising:
storing information describing an embedded virtual medium onto an optical storage medium;
allocating space for at least a portion of data for an embedded lead-in area of the embedded virtual medium, the embedded lead-in area being included within the embedded virtual medium;
allocating space for user data within the embedded virtual medium; and
marking an optical storage medium bitmap of spare sectors, including spare sectors within the embedded virtual medium, as one of in use or bad with respect to the spare sectors included in the embedded virtual medium, to avoid use as a replacement for a sector of a non-embedded virtual medium area of the optical storage medium.

16. The optical drive of claim 15, wherein the method further comprises:
marking the optical storage medium as a read only medium regardless of a type of the optical storage medium.

17. The optical drive of claim 15, wherein the storing of information describing the embedded virtual medium onto the optical storage medium further comprises:
recording the information describing the embedded virtual medium in a volume descriptor on the optical storage medium.

18. The optical drive of claim 15, wherein the method further comprises:
including encrypted data within the embedded virtual medium.

19. The optical drive of claim 15, wherein the method further comprises:
creating a plurality of embedded virtual media within the optical storage medium.

20. The optical drive of claim 15, wherein the method further comprises:
marking areas of the embedded virtual medium as unavailable for writing to prevent a legacy drive from writing to areas of the embedded virtual medium.

* * * * *